US006904564B1

(12) United States Patent
Harris et al.

(10) Patent No.: US 6,904,564 B1
(45) Date of Patent: Jun. 7, 2005

(54) METHOD OF SUMMARIZING TEXT USING JUST THE TEXT

(75) Inventors: David G Harris, Laurel, MD (US); N. Oksana Lassowsky, Riva, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 692 days.

(21) Appl. No.: 10/047,245

(22) Filed: Jan. 14, 2002

(51) Int. Cl.[7] .............................................. G06F 17/24
(52) U.S. Cl. ......................................... 715/531; 704/9
(58) Field of Search ............................... 715/531, 530; 704/9, 10, 1

(56) References Cited

U.S. PATENT DOCUMENTS

| | | | |
|---|---|---|---|
| 5,384,703 A | | 1/1995 | Withgott et al. |
| 5,638,543 A | | 6/1997 | Pedersen et al. |
| 5,708,822 A | | 1/1998 | Wical |
| 5,768,580 A | | 6/1998 | Wical |
| 5,924,108 A | | 7/1999 | Fein et al. |
| 5,978,820 A | | 11/1999 | Mase et al. |
| 6,199,034 B1 | | 3/2001 | Wical |
| 6,401,086 B1 | * | 6/2002 | Bruckner ........................ 707/4 |
| 6,537,325 B1 | * | 3/2003 | Nishizawa .................. 715/530 |
| 6,549,897 B1 | * | 4/2003 | Katariya et al. ......... 715/500.1 |
| 2002/0078090 A1 | * | 6/2002 | Hwang et al. ............... 715/513 |
| 2002/0080196 A1 | * | 6/2002 | Bornstein et al. ............ 345/854 |
| 2002/0103836 A1 | * | 8/2002 | Fein et al. ................... 715/531 |
| 2002/0138528 A1 | * | 9/2002 | Gong et al. .................. 715/531 |

OTHER PUBLICATIONS

Mani, Advances in Automatic Text Summarization—Chapter 12 "A Robust Practical Text Summarizer"(MIT Press, 1999).*

* cited by examiner

*Primary Examiner*—Heather R. Herndon
*Assistant Examiner*—Doug Hutton
(74) *Attorney, Agent, or Firm*—Robert D. Morelli

(57) ABSTRACT

A method of summarizing a text by the following steps. Identifying the textual units in the text. Selecting a first set of textual units and identifying its textual units. Selecting a second set of textual units and identifying its textual units. Determining how many textual units are shared between the first and second sets of textual units. Selecting a third set of textual units between the first and second set of textual units and identifying its unique textual units. Determining the frequency of occurrence of the textual unit in the third set of textual units. Determining the frequency of occurrence of the textual unit in the text. Determining the proximity of the results of the last two steps. Calculating a score for the first set of textual units. Assigning the highest score to the first set of textual units. Selecting a numbers of first sets of textual units, according to score, as the summary of the text.

13 Claims, 4 Drawing Sheets

1. RECEIVE TEXT
2. FIND ALL TEXT
3. SELECT 1ST SET OF TEXT
4. SELECT 2ND SET OF TEXT
5. FIND UNIQUE TEXT IN 1ST SET
6. FIND UNIQUE TEXT IN 2ND SET
7. FIND SHARED TEXT OF 1ST AND 2ND SET
8. SELECT 3RD SET OF TEXT BETWEEN 1ST AND 2ND
9. FIND UNIQUE TEXT IN 3RD SET
10. FIND UNIQUE TEXT
11. FIND UNIQUE TEXT FREQUENCY IN 3RD SET
12. FIND UNIQUE TEXT FREQUENCY
13. FIND RESULTS PROXIMITY OF STEPS 11 AND 12
14. CALCULATE SCORE FOR 1ST SET VS. 2ND SET
15. RETURN TO STEP 4 IF DESIRED
16. ASSIGN HIGHEST SCORE TO 1ST SET
17. RETURN TO STEP 3 IF DESIRED
18. SELECT TEXT AS SUMMARY ACCORDING TO SCORE

1. RECEIVE TEXT
2. FIND ALL TEXT
3. SELECT 1ST SET OF TEXT
4. SELECT 2ND SET OF TEXT
5. FIND UNIQUE TEXT IN 1ST SET
6. FIND UNIQUE TEXT IN 2ND SET
7. FIND SHARED TEXT OF 1ST AND 2ND SET
8. SELECT 3RD SET OF TEXT BETWEEN 1ST AND 2ND
9. FIND UNIQUE TEXT IN 3RD SET
10. FIND UNIQUE TEXT
11. FIND UNIQUE TEXT FREQUENCY IN 3RD SET
12. FIND UNIQUE TEXT FREQUENCY
13. FIND RESULTS PROXIMITY OF STEPS 11 AND 12
14. CALCULATE SCORE FOR 1ST SET VS. 2ND SET
15. RETURN TO STEP 4 IF DESIRED
16. ASSIGN HIGHEST SCORE TO 1ST SET
17. RETURN TO STEP 3 IF DESIRED
18. SELECT TEXT AS SUMMARY ACCORDING TO SCORE

FIG. 1

1. RECEIVE TEXT
2. FIND ALL TEXT
3. SELECT 1ST SET OF TEXT
4. SELECT 2ND SET OF TEXT
5. FIND UNIQUE TEXT IN 1ST SET
6. FIND UNIQUE TEXT IN 2ND SET
7. FIND TEXT SHARED BY 1ST AND 2ND SET
8. SELECT 3RD SET OF TEXT BETWEEN 1ST AND 2ND
9. FIND UNIQUE TEXT IN 3RD SET
10. FIND UNIQUE TEXT
11. FIND FREQUENCY OF UNIQUE TEXT IN 3RD SET
12. FIND FREQUENCY OF UNIQUE TEXT
13. FIND RESULTS PROXIMITY OF STEPS 11 AND 12
14. CALCULATE SCORE FOR 1ST SET VS. 2ND SET
15. RETURN TO STEP 4 IF DESIRED
16. ASSIGN HIGHEST SCORE TO 1ST SET
17. SELECT 4TH SET OF TEXT
18. FIND UNIQUE TEXT IN 4TH SET
19. FIND UNIQUE TEXT SHARED BY 1ST AND 4TH SET
20. FIND FREQUENCY OF UNIQUE TEXT IN 4TH SET
21. FIND RESULTS PROXIMITY OF STEPS 12 AND 20
22. CALCULATE SCORE FOR 1ST SET VS. 4TH SET
23. RETURN TO STEP 17 IF DESIRED
24. COMBINE SOME RESULTS OF STEPS 16 AND 22
25. RETURN TO STEP 3 IF DESIRED
26. SELECT SOME 1ST SETS BY SCORE AS SUMMARY

FIG. 2

1. RECEIVE TEXT
2. FIND ALL TEXT
3. SELECT 1ST SET OF TEXT
4. SELECT 2ND SET OF TEXT
5. FIND UNIQUE TEXT IN 1ST SET
6. FIND UNIQUE TEXT IN 2ND SET
7. FIND TEXT SHARED BY 1ST AND 2ND SET
8. SELECT 3RD SET OF TEXT BETWEEN 1ST AND 2ND
9. FIND UNIQUE TEXT IN 3RD SET
10. FIND UNIQUE TEXT
11. FIND FREQUENCY OF UNIQUE TEXT IN 3RD SET
12. FIND FREQUENCY OF UNIQUE TEXT
13. FIND RESULTS PROXIMITY OF STEPS 11 AND 12
14. SELECT 5TH SET OF TEXT
15. FIND UNIQUE TEXT IN 5TH SET
16. FIND FREQUENCY OF UNIQUE TEXT IN 5TH SET
17. FIND RESULTS PROXIMITY OF STEPS 12 AND 16
18. COMBINE RESULTS OF STEPS 7, 13, AND 17
19. RETURN TO STEP 4 IF DESIRED
20. ASSIGN HIGHEST RESULT OF STEP 14 TO 1ST SET
21. RETURN TO STEP 3 IF DESIRED
22. SELECT 1ST SETS BY SCORE AS SUMMARY

FIG. 3

1. RECEIVE TEXT
2. FIND SETS OF TEXT
3. FIND UNIQUE TEXT
4. ASSIGN WEIGHT TO UNIQUE TEXT
5. SELECT 1ST SET OF TEXT
6. SELECT 2ND SET OF TEXT
7. FIND UNIQUE TEXT IN 1ST SET
8. FIND UNIQUE TEXT IN 2ND SET
9. SUM WEIGHTS SHARED BY 1ST AND 2ND SETS
10. SELECT 3RD SET OF TEXT BETWEEN 1ST AND 2ND
11. FIND UNIQUE TEXT IN 3RD SET
12. FIND FREQUENCY OF UNIQUE TEXT IN 3RD SET
13. FIND FREQUENCY OF UNIQUE TEXT
14. FIND RESULTS PROXIMITY OF STEPS 12 AND 13
15. CALCULATE SCORE FOR 1ST SET VS. 2ND SET
16. RETURN TO STEP 6 IF DESIRED
17. ASSIGN HIGHEST SCORE TO 1ST SET
18. RETURN TO STEP 5 IF DESIRED
19. SELECT ONE UNIQUE TEXT
20. FIND EACH SET STEP 19 RESULT, SCORE, AND LENGTH
21. SUM SCORES
22. RECALCULATE WEIGHT OF UNIQUE TEXT
23. RETURN TO STEP 19 IF DESIRED
24. RETURN TO STEP 5 IF DESIRED
25. ASSIGN HIGHEST SCORE TO 1ST SET
26. RETURN TO STEP 5 IF DESIRED
27. SELECT 1ST SETS BY SCORE AS SUMMARY

FIG. 4

METHOD OF SUMMARIZING TEXT USING JUST THE TEXT

FIELD OF THE INVENTION

The present invention relates, in general, to data processing and, in particular, to document processing of text.

BACKGROUND OF THE INVENTION

Prior art methods of processing text typically incorporate linguistic knowledge that is not resident in the text (e.g., document) being processed. Prior art text summarization methods often rely on a collection of exemplary text that is external to the text being processed to assess the role a word plays in the text being processed. For those methods that rely on a collection of exemplary text, it is difficult, if not impossible, to generate a single collection of exemplary text that can be used to successfully summarize textual documents on widely different topics because a word in one context may have a different meaning in another context. This problem is often overcome in the prior art by generating multiple collections of exemplary text, where each collection is tailored to a specific topic (e.g., scientific, financial). Generating a collection of exemplary text is difficult, time consuming, and prone to error (e.g., biases of those generating the collection).

U.S. Pat. No. 5,384,703, entitled "METHOD AND APPARATUS FOR SUMMARIZING DOCUMENTS ACCORDING TO THEME"; U.S. Pat. No. 5,638,543, entitled, "METHOD AND APPARATUS FOR AUTOMATIC DOCUMENT SUMMARIZATION"; U.S. Pat. No. 5,708,822, entitled, "METHODS AND APPARATUS FOR THEMATIC PARSING OF DISCOURSE"; U.S. Pat. No. 5,768,580, entitled "METHODS AND APPARATUS FOR DYNAMIC CLASSIFICATION OF DISCOURSE"; U.S. Pat. No. 5,978,820, entitled "TEXT SUMMARIZING METHOD AND SYSTEM"; U.S. Pat. No. 5,924,108, entitled "DOCUMENT SUMMARIZER FOR WORD PROCESSORS"; and U.S. Pat. No. 6,199,034, entitled "METHODS AND APPARATUS FOR DETERMINING THEME FOR DISCOURSE," each disclose a method of summarizing text that relies on information not contained in the text being summarized. The information not contained in the text comes in various forms such as a stop list, a lexicon, a knowledge catalog that includes static ontologies, a word dictionary, and a pre-compiled list of words and phrases. The present invention does not rely on any of these forms of information. U.S. Pat. Nos. 5,384,703; 5,638,543; 5,708,822; 5,768,580; 5,978,820; 5,924,108; and 6,199,034 are hereby incorporated by reference into the specification of the-present invention.

SUMMARY OF THE INVENTION

It is an object of the present invention to summarize text based solely on the text itself and not on any information outside of the text.

It is another object of the present invention to summarize text without considering the definition of any term contained therein.

It is another object of the present invention to summarize text by measuring the similarity between passages in the text and measuring the significance of any similarity.

The present invention is a method of summarizing text in a manner that relies solely on the text itself. The first step of the method is receiving text.

The second step of the method is identifying all of the textual units in the text.

The third step of the method is selecting a first set of textual units from the text.

The fourth step of the method is selecting a second set of textual units from the text.

The fifth step of the method is identifying each unique textual unit in the first set of textual units.

The sixth step of the method is identifying each unique textual unit in the second set of textual units.

The seventh step of the method is determining how many textual units are shared between the first and second sets of textual units.

The eighth step of the method is selecting a third set of textual units from the text, where the third set of textual units is between the first and second set of textual units.

The ninth step of the method is identifying each unique textual unit in the third set of textual units.

The tenth step of the method is identifying each unique textual unit in the text.

The eleventh step of the method is determining the frequency of occurrence of each unique textual unit in the third set of textual units.

The twelfth step of the method is determining the frequency of occurrence of each unique textual unit in the text.

The thirteenth step of the method is determining the proximity of the results of the eleventh step and the twelfth step.

The fourteenth step of the method is calculating a score for the first set of textual units with respect to the second set of textual units as a function of the results of the seventh step and the thirteenth step.

The fifteenth step of the method is returning to the fourth step if additional processing is desired.

The sixteenth step of the method is assigning the highest scoring result of the fourteenth step to the first set of textual units.

The seventeenth step of the method is returning to the third step if additional processing is desired.

The eighteenth step of the method is selecting a user-definable number of first sets of textual units selected in the third step according to the scores assigned thereto as the summary of the text.

In an alternate embodiment, a set of textual units that has already been summarized by another set of textual units is no longer considered. In a second alternate embodiment, the score of a set of textual units is modified based on how dissimilar the set of textual units is from another set of textual units that extends to the end of the text. In a third alternate embodiment, weights are included to account for textual units that have greater significance than others.

BRIEF DESCRIPTION OF THE DRAWINGS

FIG. 1 is a list of steps of the present invention;

FIG. 2 is a list of steps of a first alternate embodiment of the present invention;

FIG. 3 is a list of steps of a second alternate embodiment of the present invention; and FIG. 4 is a list of steps of a third alternate embodiment of the present invention.

DETAILED DESCRIPTION

The present invention is a method of summarizing text (e.g., a document) in a manner that relies solely on the text itself and does not rely on any information that is external to the text (e.g., dictionary, collection of terms for a particular topic of interest). The present method identifies at least one set of textual units in the text that best summarize the text, where a textual unit may be one or more words, ASCII characters, graphics (e.g., musical notes) phrases, sentences, paragraphs, and so on. The present method does not consider the meaning of any textual unit in the text and, therefore, does not require the use of a dictionary, a collection of exemplary text for a particular topic, or any other information that is external to the text.

The present invention is based on two premises. The first premise is that a textual unit in a particular set of textual units (e.g., set of contiguous sentences, paragraph(s), chapter(s)) that is a candidate for inclusion in a summary of a text will resemble other sets of textual units within the text. For example, a sentence within one paragraph of a text that resembles other paragraphs within the text (e.g., shares similar terms) should be included in the summary of the text. Therefore, the present invention measures the similarity between sets of textual units within a text.

The second premise is that the similarity of a textual unit within a first set of textual units to a second set of textual units is significant only if a third set of textual units between the first and second sets of textual units is dissimilar to the first and second sets of textual units. For example, if the terms in a third set of textual units are dissimilar than those of a first and second set of textual units then a similarity of terms between the first and second set of textual units is significant. If a textual unit is included in a summary of the text then the text will not only discuss the topic of the textual unit included in the summary but also discuss other matters before returning to the topic. If the intervening set of textual units discusses the same topic then this indicates that the text simply discusses one topic at length, and any similarity between a first and second set of textual units is not significant.

FIG. 1 is a list of steps of the present invention. The first step 1 of the method is receiving text (i.e., document) to be summarized. The text includes a number of sets of textual units (e.g., set of contiguous sentences, paragraph(s), chapter(s)), where each set of textual units includes a number of textual units (e.g., word(s), ASCII character(s), phrase(s), sentence(s), paragraph(s)).

The second step 2 of the method is identifying all of the textual units in the text The third step 3 of the method is selecting a first set of textual units from the text.

The fourth step 4 of the method is selecting a second set of textual units from the text. In the preferred embodiment, the second set of textual units occurs after the first set of textual units in the text. The second set of textual units may, or may not, overlap with the first set of textual units. That is, the second set of textual units may include one or more textual units from the first set of textual units.

The fifth step 5 of the method is identifying each unique textual unit (e.g., word) in the first set of textual units.

The sixth step 6 of the method is identifying each unique textual unit in the second set of textual units.

The seventh step 7 of the method is determining how many textual units are shared between the first and second sets of textual units. The seventh step 7 measures the similarity between the first and second sets of textual units and, therefore satisfies the first premise of the present invention.

The eighth step 8 of the method is selecting a third set of textual units from the text, where the third set of textual units is between the first and second set of textual units. In the preferred embodiment, the third set of textual units includes the last textual unit of the first set of textual units and the first textual unit of the second set of textual units.

The ninth step 9 of the method is identifying each unique textual unit in the third set of textual units.

The tenth step 10 of the method is identifying each unique textual unit in the text.

The eleventh step 11 of the method is determining the frequency of occurrence of each unique textual unit in the third set of textual units. The frequency of occurrence of a textual unit a in the third set of textual units is determined by dividing the number of occurrences of the textual unit in the third set of textual units by the total number of textual units in the third set of textual units.

The twelfth step 12 of the method is determining the frequency of occurrence of each unique textual unit in the text. The frequency of occurrence of a textual unit in the text is determined by dividing the number of occurrences of the textual unit in the text by the total number of textual units in the text.

The thirteenth step 13 of the method is determining the proximity of the results of the eleventh step 11 and the twelfth step 12. In the preferred embodiment, proximity is determined by multiplying, for each unique textual unit in the third set of textual units, the frequency of occurrence of the unique textual unit in the third set of textual units by the logarithm (log) of the frequency of occurrence of the unique textual unit in the third set of textual units; summing the products of the last step; multiplying, for each unique textual unit in the third set of textual units, the frequency of occurrence of the unique textual unit in the third set of textual units by the log of the frequency of occurrence of the unique textual unit in the text; summing the products of the last step; and dividing the first sum by the second sum.

The fourteenth step 14 of the method is calculating a score for the first set of textual units with respect to the second set of textual units as a function of the results of the seventh step 7 and the thirteenth step 13. In the preferred embodiment, the score for the first set of textual units with respect to the second set of textual units is calculated as the product of the seventh step 7 and the thirteenth step 13. The fourteenth step 14 measures the significance of any similarity between the first and second sets of textual units (i.e., the second premise of the present invention).

The fifteenth step 15 of the method is returning to the fourth step 4 if additional processing is desired. Otherwise, proceeding to the sixteenth step 16.

The sixteenth step 16 of the method is assigning the highest scoring result of the fourteenth step 14 to the first set of textual units.

The seventeenth step 17 of the method is returning to the third step 3 if additional processing is desired. Otherwise, proceeding to the eighteenth step 18.

The eighteenth step 18 of the method is selecting a user-definable number of first sets of textual units selected in the third step 3 according to the scores assigned thereto as the summary of the text. In the preferred embodiment, the summary of the text is a user-definable number of first sets of textual units having the highest scores.

If a set of textual units that has already been summarized by another set of textual units is included in the summary then the summary will include some redundancy. To avoid redundancy, it is desired to insure that a set of textual units only appears once in a summary. FIG. 2 is a list of steps of an alternate embodiment of the present invention that minimizes redundancy in a summary by introducing a penalty to the score of a set of textual units that has already been summarized by another set of textual units.

The first step 21 of the alternate method is receiving the text. The text includes a number of sets of textual units, where each set of textual units includes a number of textual units.

The second step 22 of the alternate method is identifying the sets of textual units in the text.

The third step 23 of the alternate method is selecting a first set of textual units from the text.

The fourth step 24 of the alternate method is selecting a second set of textual units from the text.

The fifth step 25 of the alternate method is identifying each unique textual unit in the first set of textual units.

The sixth step 26 of the alternate method is identifying each unique textual unit in the second set of textual units.

The seventh step 27 of the alternate method is determining how many textual units are shared between the results of the fifth step 25 and the sixth step 26.

The eighth step 28 of the alternate method is selecting a third set of textual units from the text, where the third set of textual units is between the first and second set of textual units.

The ninth step 29 of the alternate method is identifying each unique textual unit in the third set of textual units.

The tenth step 30 of the alternate method is identifying each unique textual unit in the text.

The eleventh step 31 of the alternate method is determining the frequency of occurrence of each unique textual unit in the third set of textual units.

The twelfth step 32 of the alternate method is determining the frequency of occurrence of each unique textual unit in the text.

The thirteenth step 33 of the alternate method is determining the proximity of the results of the eleventh step 31 and the twelfth step 32.

The fourteenth step 34 of the alternate method is calculating a score for the first set of textual units with respect to the second set of textual units as a function of the results of the seventh step 27 and the thirteenth step 33.

The fifteenth step 35 of the alternate method is returning to the fourth step 24 if additional processing is desired. Otherwise, proceeding to the sixteenth step 36.

The sixteenth step 36 of the alternate method is assigning the highest result of the fourteenth step 34 to the first set of textual units.

The seventeenth step 37 of the alternate method is selecting a fourth set of textual units from the text. The fourth set of textual units is contiguous with the first set of textual units.

The eighteenth step 38 of the alternate method is identifying each unique textual unit in the fourth set of textual units.

The nineteenth step 39 of the alternate method is determining how many textual units are shared between the results of the fifth step 25 and the eighteenth step 38.

The twentieth step 40 of the alternate method is determining the frequency of occurrence of each unique textual unit in the fourth set of textual units.

The twenty-first step 41 of the alternate method is determining the proximity of the results of the twelfth step 32 and the twentieth step 40.

The twenty-second step 42 of the alternate method is calculating a score for the first set of textual units with respect to the fourth set of textual units as a function of the results of the nineteenth step 39 and the twenty-first step 41. In the preferred embodiment, the twenty-second step 42 is accomplished by subtracting the result of the twenty-first step 41 from a number having a value equal to one and then multiplying the difference by the result of the nineteenth step 39.

The twenty-third step 43 of the alternate method is returning to the seventeenth step 37 if additional processing is desired. Otherwise, proceeding to the twenty-fourth step 44.

The twenty-fourth step 44 of the alternate method is combining a user-definable number of results of the twenty-second step 42 with the result of the sixteenth step 36. In the preferred embodiment, the user-definable number of results selected from the twenty-second step 42 are a user-definable number of the highest values calculated in the twenty-second step 42.

The twenty-fifth step 45 of the alternate method is returning to the third step 23 if additional processing is desired. Otherwise, proceeding to the eighteenth step 38.

The twenty-sixth, and final, step 46 of the alternate method is selecting a user-definable number of first set of textual units selected in the third step 23 according to the scores assigned thereto as the summary of the text.

A set of textual units will score well against a set of textual units that includes most of the text. Such a score is not very useful when trying to discriminate between set of textual units with regard to identifying the best sets of textual units to summarize a text. FIG. 3 is a list of steps of a second alternate embodiment of the present invention that modifies the score of a set of textual units based on how dissimilar the set of textual units is from another set of textual units. In the preferred second alternate embodiment, the set of textual units to which a set of textual units is compared extends to the end of the text.

The first step 51 of the second alternate method is receiving text. The text includes a number of sets of textual units, where each set of textual units includes a number of textual units.

The second step 52 of the second alternate method is identifying the sets of textual units in the text.

The third step 53 of the second alternate method is selecting a first set of textual units from the text.

The fourth step 54 of the second alternate method is selecting a second set of textual units from the text.

The fifth step 55 of the second alternate method is identifying each unique textual unit in the first set of textual units.

The sixth step 56 of the second alternate method is identifying each unique textual unit in the second set of textual units.

The seventh step 57 of the second alternate method is determining how many textual units are shared between the results of the fifth step 55 and the sixth step 56.

The eighth step 58 of the second alternate method is selecting a third set of textual units from the text, where the third set of textual units is between the first and second sets of textual units.

The ninth step 59 of the second alternate method is identifying each unique textual unit in the third set of textual units.

The tenth step 60 of the second alternate method is identifying each unique textual unit in the text.

The eleventh step 61 of the second alternate method is determining the frequency of occurrence of each unique textual unit in the third set of textual units.

The twelfth step 62 of the second alternate method is determining the frequency of occurrence of each unique textual unit in the text.

The thirteenth step 63 of the second alternate method is determining the proximity of the results of the eleventh step 61 and the twelfth step 62.

The fourteenth step 64 of the second alternate method is selecting a fifth set of textual units from the text, where the fifth set of textual units is contiguous with the second set of textual units.

The fifteenth step 65 of the second alternate method is identifying each unique textual unit in the fifth set of textual units.

The sixteenth step 66 of the second alternate method is determining the frequency of occurrence of each unique textual unit in the fifth set of textual units.

The seventeenth step 67 of the second alternate method is determining the proximity of the results of the twelfth step 62 and the sixteenth step 66.

The eighteenth step 68 of the second alternate method is combining the results of the seventh step 57, the thirteenth step 63, and the seventeenth step 67.

The nineteenth step 69 of the second alternate method is returning to the fourth step 54 if additional processing is desired. Otherwise, proceeding to the twentieth step 70.

The twentieth step 70 of the second alternate method is assigning the highest result of the fourteenth step 64 to the first set of textual units.

The twenty-first step 71 of the second alternate method is returning to the third step 53 if additional processing is desired. Otherwise, proceeding to the twenty-second step 72.

The twenty-second, and last, step 72 of the second alternate method is selecting a user-definable number of first set of textual units selected in the third step 53 according to the scores assigned thereto as the summary of the text.

Some textual units (e.g., words) in the sets of textual units (e.g., sentences) of a text may deserve greater weight than other textual units. A third alternate embodiment of the present invention operates under two premises regarding textual units. The first premise is that high scoring sets of textual units are marked by the presence of certain textual units. The second premise is that a textual unit is important only if it occurs often in many high-scoring sets of textual units. The second premise implies that a textual unit is important, and deserves greater weight, only if it helps to distinguish high-scoring sets of textual units from low-scoring sets of textual units. The present invention is able to determine the weights of textual units by relying solely on the text itself and does not require the use of any information external to the text. FIG. 4 is a list of steps of a third alternate embodiment of the present invention that gives weights to the textual units and uses the same to best summarize text.

The first step 81 of the third alternate method is receiving the text. The text includes a number of sets of textual units (e.g., sentences), where each set of textual units includes a number of contiguous textual units (e.g., words).

The second step 82 of the third alternate method is identifying the sets of textual units in the text.

The third step 83 of the third alternate method is identifying each unique textual unit in the text.

The fourth step 84 of the third alternate method is assigning a user-definable weight to each textual unit identified in the third step 83. If a particular topic is of interest, the words associated with the topic may be assigned a greater weight than those that are not associated with the topic.

The fifth step 85 of the third alternate method is selecting a first set of textual units from the text.

The sixth step 86 of the third alternate method is selecting a second set of textual units from the text.

The seventh step 87 of the third alternate method is identifying each unique textual unit in the first set of textual units.

The eighth step 88 of the third alternate method is identifying each unique textual unit in the second set of textual units.

The ninth step 89 of the third alternate method is summing the weights of the textual units that are shared between the results of the seventh step 87 and the eighth step 88.

The tenth step 90 of the third alternate method is selecting a third set of textual units from the text, where the third set of textual units is between the first and second set of textual units.

The eleventh step 91 of the third alternate method is identifying each unique term in the third set of textual units.

The twelfth step 92 of the third alternate method is determining the frequency of occurrence of each unique textual unit in the third set of textual units.

The thirteenth step 93 of the third alternate method is determining the frequency of occurrence of each unique textual unit in the text.

The fourteenth step 94 of the third alternate method is determining the proximity of the results of the twelfth step 92 and the thirteenth step 93.

The fifteenth step 95 of the third alternate method is calculating a score for the first set of textual units with respect to the second set of textual units as a function of the results of the ninth step 89 and the fourteenth step 94.

The sixteenth step 96 of the third alternate method is returning to the sixth step 86 if additional processing is desired. Otherwise, proceeding to the seventeenth step 97.

The seventeenth step 97 of the third alternate method is assigning the highest result of the fifteenth step 95 to the first set of textual units.

The eighteenth step 98 of the third alternate method is returning to the fifth step 85 if additional processing is desired. Otherwise, proceeding to the nineteenth step 99.

The nineteenth step 99 of the third alternate method is selecting one of the unique textual units in the text.

The twentieth step 100 of the third alternate method is identifying, for the unique textual unit selected in the nineteenth step 99, each set of textual units in the text in which the selected unique textual unit appears for which a score was calculated, the score corresponding to each identified set of textual units, and the length of each identified set of textual units.

The twenty-first step 101 of the third alternate method is summing the scores identified in the twentieth step 100.

The twenty-second step 102 of the third alternate method is recalculating the weight of the unique textual unit selected in the nineteenth step 99 as the combination of the result of the twenty-first step 101 and the lengths and the scores identified in the twentieth step 100. In a variation of the third alternate embodiment, textual units having a weight below a user-definable weight are identified as stop words. Stop words are then removed from the text to improve the performance and quality of the method. In yet another variation of the third alternate embodiment, textual units having a weight greater than a user-definable weight are identified as key words. Key words may be returned as a key-word summary of the text.

The twenty-third step 103 of the third alternate method is returning to the nineteenth step 99 if additional unique textual units are desired to be weighted. Otherwise, proceeding to the twenty-fourth step 104.

If additional processing is desired, the twenty-fourth step 104 of the third alternate method is returning to the fifth step 85. Otherwise, proceed to the twenty-fifth step 105.

The twenty-fifth step 105 of the third alternate method is assigning the highest result of the fifteenth step 95 to the first set of textual units.

The twenty-sixth step 106 of the third alternate method is returning to the fifth step 85 if additional processing is desired. Otherwise, proceeding to the twenty-seventh step 107.

The twenty-seventh, and last, step 107 of the third alternate method is selecting a user-definable number of first sets of textual units selected in the fifth step 85 according to the scores assigned thereto as the summary of the text.

What is claimed is:

1. A computerized method of summarizing a text, comprising the steps of:
    (a) receiving the text, where the text includes at least one set of textual units, where each set of textual units includes at least one textual unit;
    (b) identifying all of the textual units in the text;
    (c) selecting a first set of textual units from the text;
    (d) selecting a second set of textual units from the text;
    (e) identifying each unique textual unit in the first set of textual units;
    (f) identifying each unique textual unit in the second set of textual units;
    (g) determining how many textual units are shared-between the first set of textual units and the second set of textual units;
    (h) selecting a third set of textual units from the text, where the third set of textual units is between a first textual unit of the first set of textual units and a last textual unit of the second set of textual units;
    (i) identifying each unique textual unit in the third set of textual units;
    (j) identifying each unique textual unit in the text;
    (k) determining the frequency of occurrence of each unique textual unit in the third set of textual units;
    (l) determining the frequency of occurrence of each unique textual unit in the text;
    (m) determining the proximity of the results of step (k) and step (l);
    (n) calculating a score for the first set of textual units with respect to the second set of textual units as a function of the results of step (g) and step (m);
    (o) returning to step (d) if additional processing is desired, otherwise, proceeding to step (p);
    (p) assigning the highest scoring result of step (n) to the first set of textual units;
    (q) returning to step (c) if additional processing is desired, otherwise, proceeding to step (r); and
    (r) selecting a user-definable number of first sets of textual units selected in step (c) according to the scores assigned thereto as the summary of the text.

2. The computerized method of claim 1, wherein the step of selecting a second set of textual units from the text is comprised of the step of selecting a second set of textual units that occurs after the first set of textual units.

3. The computerized method of claim 1, wherein the step of selecting a second set of textual units from the text is comprised of the step of selecting a second set of textual units, where the second set of textual includes at least one textual unit from the first set of textual units.

4. The computerized method of claim 1, wherein the step of selecting a third set of textual units from the text is comprised of the step of selecting a third set of textual units that includes the last textual unit of the first set of textual units and the first textual unit of the second set of textual units.

5. The computerized method of claim 1, wherein the step of determining proximity of the results of step (k) and step (l) is comprised of the steps of:
    (a) multiplying, for each unique textual unit in the third set of textual units, the frequency of occurrence of the unique textual unit in the third set of textual units by a logarithm of the frequency of occurrence of the unique textual unit in the third set of textual units;
    (b) summing the results of step (a);
    (c) multiplying, for each unique textual unit in the third set of textual units, the frequency of occurrence of the unique textual unit in the third set of textual units by the logarithm of the frequency of occurrence of the unique textual unit in the text;
    (d) summing the results of step (c); and
    (e) dividing the result of step (b) by the result of step (d).

6. The computerized method of claim 1, wherein the step of calculating a score for the first set of textual units with respect to the second set of textual units as a function of the results of step (g) and step (m) is comprised of the step of calculating the product of step (g) and step (m).

7. A computerized method of summarizing a text, comprising the steps of:
    (a) receiving the text, where the text includes at least one set of textual units, where each set of textual units includes at least one textual unit;
    (b) identifying each set of textual units in the text;
    (c) selecting a first set of textual units from the text;
    (d) selecting a second set of textual units from the text;
    (e) identifying each unique textual unit in the first set of textual units;
    (f) identifying each unique textual unit in the second set of textual units;
    (g) determining how many textual units are shared between the results of step (e) and step (f);
    (h) selecting a third set of textual units from the text, where the third set of textual units is between the first set of textual units and the second set of textual units;
    (i) identifying each unique textual unit in the third set of textual units;
    (j) identifying each unique textual unit in the text;
    (k) determining the frequency of occurrence of each unique textual unit in the third set of textual units;
    (l) determining the frequency of occurrence of each unique textual unit in the text;
    (m) determining the proximity of the results of step (k) and step (l);

(n) calculating a score for the first set of textual units with respect to the second set of textual units as a function of the results of step (g) and step (m);

(o) returning to step (d) if additional processing is desired, otherwise, proceeding to step (p);

(p) assigning the highest result of step (n) to the first set of textual units;

(q) selecting a fourth set of textual units from the text, where the fourth set of textual units is contiguous with the first set of textual units;

(r) identifying each unique textual unit in the fourth set of textual units;

(s) determining how many textual units are shared between the results of step (e) and step (r);

(t) determining the frequency of occurrence of each unique textual unit in the fourth set of textual units;

(u) determining the proximity of the results of step (1) and step (t);

(v) calculating a score for the first set of textual units with respect to the fourth set of textual units as a function of the results of step (s) and step (u);

(w) returning to step (q) if additional processing is desired, otherwise, proceeding to step (x);

(x) combining a user-definable number of results of step (v) with the result of step (p);

(y) returning to step (c) if additional processing is desired, otherwise, proceeding to step (z); and (z) selecting a user-definable number of first set of textual units selected in step (c) according to the scores assigned thereto as the summary of the text.

8. The computerized method of claim 7, wherein said step of calculating a score for the first set of textual units with respect to the fourth set of textual units as a function of the results of step (s) and step (u) is comprised of the steps of:

(a) subtracting the result of step (u) from a number having a value equal to one; and (b) multiplying the result of the last step by the result of step (s).

9. The computerized method of claim 7, wherein said step of combining a user-definable number of results of step (v) with the result of step (p) is comprised of the step of combining a user-definable number of results of step (v) with the results of step (p), where the results selected from step (v) are the highest values calculated in step (v).

10. A computerized method of summarizing text, comprising the steps of:

(a) receiving text, where the text includes at least one set of textual units, where each set of textual units includes at least one textual unit;

(b) identifying the sets of textual units in the text;

(c) selecting a first set of textual units from the text;

(d) selecting a second set of textual units from the text;

(e) identifying each unique textual unit in the first set of textual units;

(f) identifying each unique textual unit in the second set of textual units;

(g) determining how many textual units are shared between the results of step (e) and step (f);

(h) selecting a third set of textual units from the text, where the third set of textual units is between the first set of textual units and the second sets of textual units;

(i) identifying each unique textual unit in the third set of textual units;

(j) identifying each unique textual unit in the text;

(k) determining the frequency of occurrence of each unique textual unit in the third set of textual units;

(l) determining the frequency of occurrence of each unique textual unit in the text;

(m) determining the proximity of the results of step (k) and step (l);

(n) selecting a fifth set of textual units from the text, where the fifth set of textual units is contiguous with the second set of textual units;

(o) identifying each unique textual unit in the fifth set of textual units;

(p) determining the frequency of occurrence of each unique textual unit in the fifth set of textual units;

(q) determining the proximity of the results of step (l) and step (p);

(r) combining the results of step (g), step (m), and step (q);

(s) returning to step (d) if additional processing is desired, otherwise, proceeding to step (t);

(t) assigning the result of step (r) to the first set of textual units;

(u) returning to step (c) if additional processing is desired, otherwise, proceeding to step (v); and (v) selecting a user-definable number of first sets of textual units selected in step (c) according to the scores assigned thereto as the summary of the text.

11. A computerized method of summarizing text, comprising the steps of:

(a) receiving the text, where the text includes at least one set of textual units, where each set of textual units includes a plurality of contiguous textual units;

(b) identifying the sets of textual units in the text;

(c) identifying each unique textual unit in the text;

(d) assigning a user-definable weight to each textual unit identified in step (c);

(e) selecting a first set of textual units from the text;

(f) selecting a second set of textual units from the text;

(g) identifying each unique textual unit in the first set of textual units;

(h) identifying each unique textual unit in the second set of textual units;

(i) summing the weights of the textual units that are shared between the results of the step (g) and step (h);

(j) selecting a third set of textual units from the text, where the third set of textual units is between the first set of textual units and the second set of textual units;

(k) identifying each unique textual unit in the third set of textual units;

(l) determining the frequency of occurrence of each unique textual unit in the third set of textual units;

(m) determining the frequency of occurrence of each unique textual unit in the text;

(n) determining the proximity of the results of step (l) and step (m);

(o) calculating a score for the first set of textual units with respect to the second set of textual units as a function of the results of step (i) and step (n);

(p) returning to step (f) if additional processing is desired, otherwise, proceeding to step (q);

(q) assigning the highest result of step (o) to the first set of textual units;

(r) returning to step (e) if additional processing is desired, otherwise, proceeding to step (s);

(s) selecting one of the unique textual units in the text;

(t) identifying, for the unique textual unit selected in step (s), each set of textual units in the text in which the selected unique textual unit appears for which a score was calculated, the score corresponding to each identified set of textual units, and the length of each identified set of textual units;

(u) summing the scores identified in step (t);

(v) recalculating the weight of the unique textual unit selected in step (s) as the combination of the result of step (u) and the lengths and the scores identified in step (t);

(w) returning to step (s) if additional unique textual units are desired to be weighted, otherwise, proceeding to step (x);

(x) if additional processing is desired, returning to the step (e), otherwise, proceeding to step (y);

(y) assigning the highest result of step (o) to the first set of textual units;

(z) returning to step (e) if additional processing is desired, otherwise, proceeding to step (aa); and (aa) selecting a user-definable number of first sets of textual units selected in step (e) according to the scores assigned thereto as the summary of the text.

12. The computerized method of claim 11, further comprising the steps of:

(a) setting a user-definable stop-word threshold;

(b) identifying each textual unit having a weight below the stop-word threshold; and (c) removing the textual units identified in step (b) from the text.

13. The computerized method of claim 11, further comprising the steps of:

(a) setting a user-definable key-word threshold;

(b) identifying each textual units having a weight above the key-word threshold; and (c) returning a key-word summary of the text that includes the textual units identified in step (b).

* * * * *